United States Patent [19]

Enoki et al.

[11] Patent Number: 5,794,134
[45] Date of Patent: Aug. 11, 1998

[54] RECEIVING CIRCUIT FOR A PORTABLE TELEPHONE SET

[75] Inventors: Takashi Enoki; Fujio Sasaki, both of Yokohama, Japan

[73] Assignee: Matsushita Electric Industrial Co., Ltd., Osaka, Japan

[21] Appl. No.: 675,984

[22] Filed: Jul. 9, 1996

[30] Foreign Application Priority Data

Aug. 14, 1995 [JP] Japan ................................. 7-227013

[51] Int. Cl.$^6$ ................................................ H04B 1/10
[52] U.S. Cl. ................................. 455/286; 455/307
[58] Field of Search .......................... 455/266, 280, 455/283, 284, 285, 286, 287, 290, 296, 307, 310, 311

[56] References Cited

U.S. PATENT DOCUMENTS

| | | |
|---|---|---|
| 4,004,105 | 1/1977 | Mizukoshi . |
| 4,385,402 | 5/1983 | Barrs .......................................... 455/307 |
| 4,470,138 | 9/1984 | Gutleber . |
| 5,499,394 | 3/1996 | Kaatz et al. ............................. 455/266 |
| 5,564,093 | 10/1996 | Matsumoto ............................. 455/307 |

*Primary Examiner*—Amelia Au
*Attorney, Agent, or Firm*—Pearne, Gordon, McCoy and Granger LLP

[57] ABSTRACT

An unnecessary wave suppressing means suppresses unnecessary waves included in a reception high frequency signal in a frequency band that is changed in accordance with a switching signal. The unnecessary wave suppressing means changes the pass band by inserting a notch into a pass band at a range where a signal is to be suppressed, changing the pass band width so as to exclude a suppression band, retaining a plurality of narrow pass bands for respective frequency bands used and switching among those narrow pass bands in accordance with a frequency band of a receiving signal, or continuously changing the pass band by using a tuning filter.

10 Claims, 5 Drawing Sheets

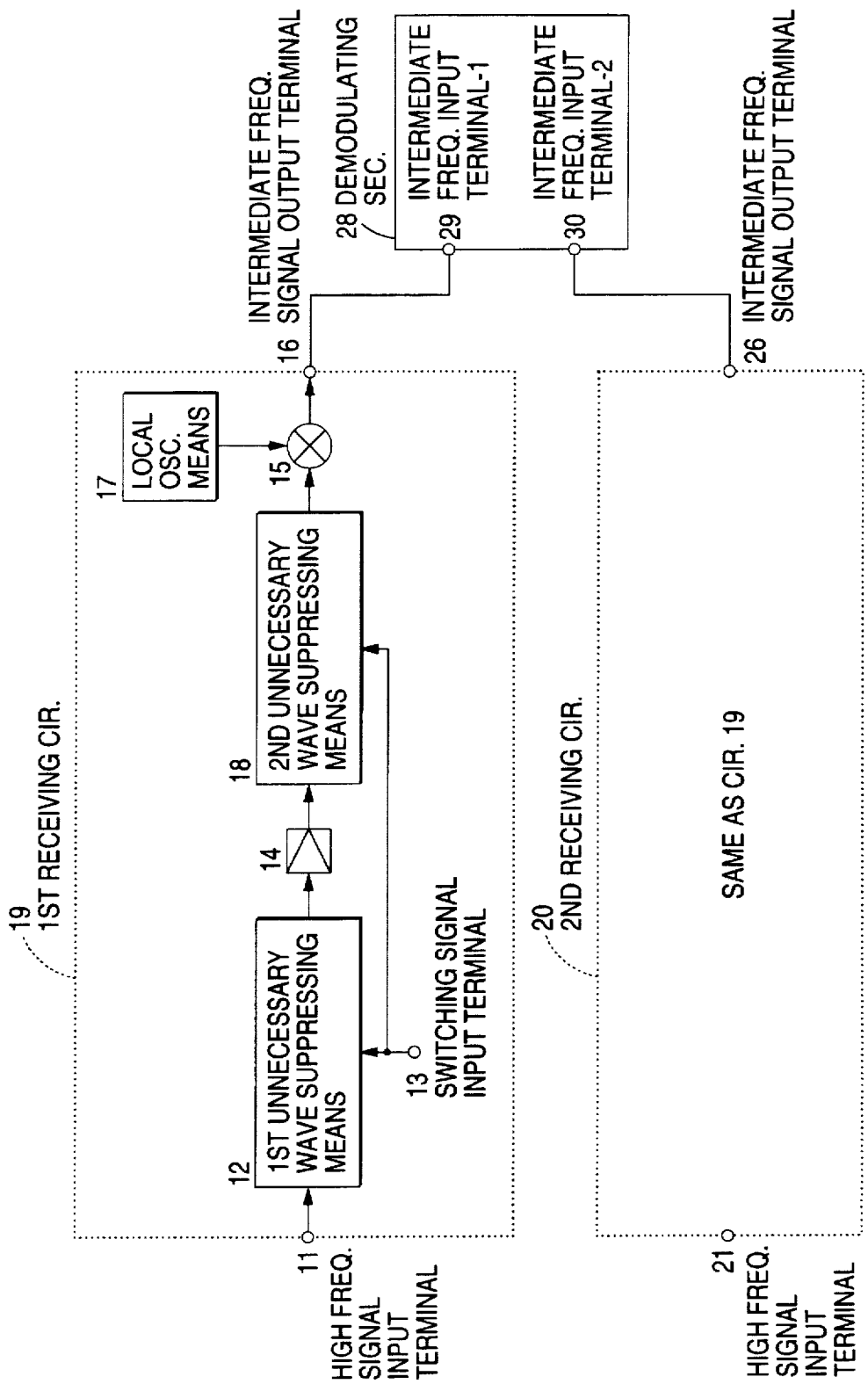

RECEIVING CIRCUIT FOR A PORTABLE TELEPHONE SET

BACKGROUND OF THE INVENTION

1. Field of the Invention

The present invention relates to a receiving circuit to be used in radio receivers such as mobile communications equipment. In particular, the invention relates to a receiving circuit capable of receiving signals of a plurality of frequency bands.

2. Description of the Related Art

A radio receiver such as a portable telephone set is equipped with a receiving circuit for converting a high frequency signal that is received by an antenna to an intermediate frequency signal and a demodulating section for demodulating the intermediate frequency reception signal.

For instance in Japan, the portable telephone system is now being operated by using two frequency bands: a 800-MHz band and a 1.5-GHz band. Accordingly, telephone sets are produced so as to be dedicated to the respective bands and receiving circuits are designed for the respective bands.

However, in the above type of operation using two frequency bands, two telephone sets are needed to receive signals in both frequency bands, which is very costly to a user. If a telephone set is so constructed as to receive signals of both frequency bands simply by combining receiving circuits for the respective bands, the circuit scale becomes too large: the telephone set becomes voluminous and heavy and hence no longer suitable for portable use. The same thing applies to a case of receiving signals of a plurality of frequency bands that are different from the specific bands mentioned above.

SUMMARY OF THE INVENTION

The present invention has been made to solve the above problems in the art and, therefore, has an object of providing a receiving circuit which, though simple in configuration, can receive signals of a plurality of frequency bands, and which realizes a compact receiver.

To attain the above object, in a receiving circuit for a portable telephone set which circuit converts a high frequency signal that is received by an antenna into an intermediate frequency signal, there is provided means for suppressing unnecessary waves included in the high frequency signal in a frequency band that is changed in accordance with a switching signal.

The unnecessary wave suppressing means may be so constructed as to suppress unnecessary waves by inserting at least one notch into a pass frequency band.

The unnecessary wave suppressing means may be so constructed as to switch between at least two pass frequency band widths.

The unnecessary wave suppressing means may be so constructed as to have at least two pass frequency bands and switch between those two bands.

The unnecessary wave suppressing means may be so constructed as to change the pass frequency band continuously in accordance with the switching signal.

The receiving circuit may further comprise second unnecessary wave suppressing means for suppressing unnecessary waves included in a signal that is output from the unnecessary wave suppressing means in the frequency band that is indicated by the switching signal.

There may be provided two systems of the above receiving circuit.

The receiving circuit may further comprise a plurality of antennas, and means for selecting one of high frequency signals received by the plurality of antennas.

In the receiving circuit having the above configuration, in the case of allowing passage of signals in a plurality of frequency bands, the unnecessary wave suppressing means causes all of those bands to be included in a pass band. In receiving a signal in one of those frequency bands the unnecessary wave suppressing means changes the pass band so as to substantially suppress the receiving sensitivity in the remaining bands. As a result, the invention allows, even with a single system of receiving circuit, signal reception in a plurality of frequency bands with superior receiving characteristics.

The unnecessary wave suppressing means changes the pass band by inserting a notch into a pass band at a range where a signal is to be suppressed, changing the pass frequency band width so as to exclude a suppression band, retaining a plurality of narrow pass bands for respective frequency bands used and switching among those narrow pass bands in accordance with a frequency band of a receiving signal, or continuously changing the pass band by using a tuning filter.

The receiving circuit having two-step unnecessary wave suppressing means can increase the amount of attenuation of unnecessary waves. By sharing the unnecessary wave suppressing function, the load on each unnecessary wave suppressing means can be reduced.

Further, a diversity receiving circuit can be formed by providing two systems of receiving circuits or selecting among reception signals of a plurality of antennas.

BRIEF DESCRIPTION OF THE DRAWINGS

FIG. 8 is a block diagram showing the configuration of a receiving circuit according to a sixth embodiment of the invention;

DESCRIPTION OF THE PREFERRED EMBODIMENTS

Embodiment 1

Figure 1:
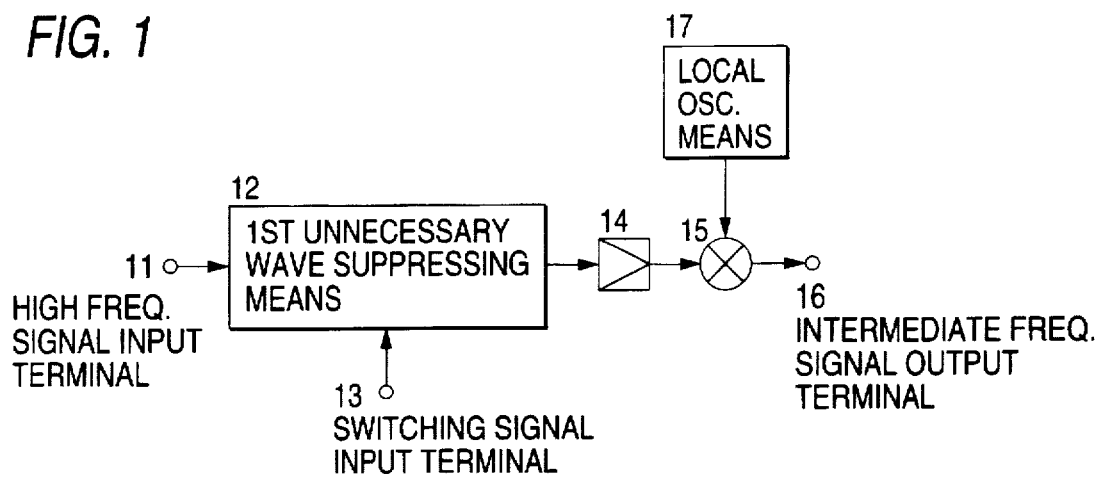
FIG. 1 is a block diagram showing the configuration of a receiving circuit according to a first embodiment of the present invention.

As shown in FIG. 1, a receiving circuit according to a first embodiment of the present invention is configured as follows. A high frequency signal received by an antenna is input to an input terminal 11. An unnecessary wave suppressing means 12 suppresses unnecessary waves by changing the signal pass band in accordance with a switching signal that is input to a switching signal input terminal 13. An amplifier 14 amplifies a reception signal that has passed through the unnecessary wave suppressing means 12. A local oscillation means 17 generates a signal to be used for shifting the frequency of the reception signal from a high frequency to an intermediate frequency. A mixer 15 converts the high frequency signal as output from the amplifier 14 into an intermediate frequency signal by mixing the former with the signal that is sent from the local oscillation means 17. The resulting intermediate frequency signal is supplied from an output terminal 16 to a demodulating section of the receiver.

The unnecessary wave suppressing means 12 switches, in accordance with a switching signal that is input to the switching signal input terminal 13, between a state that two frequency bands having respective central frequencies $f_1$ and $f_2$ are both made pass bands and a state that signal passage is suppressed in at least one of the two frequency bands.

Any signal in both of the $f_1$ frequency band and the $f_2$ frequency band that can be used in the receiver concerned is received by the antenna, and a high frequency reception signal is input to the high frequency signal input terminal 11 of the receiving circuit. At a stage of waiting for signals in both frequency bands, the unnecessary wave suppressing means 12 causes both frequency bands to be included in a pass band. On the other hand, at a stage of conducting a telephone call by using a communication channel of one of the two frequency bands, the unnecessary wave suppressing means 12 suppresses signal passage in the other frequency band, that is, suppresses unnecessary waves. Switching signals suitable for the respective stages are input to the switching signal input terminal 13.

Figure 2:
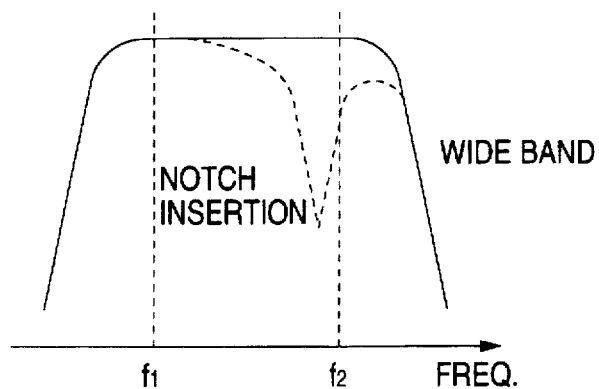
FIG. 2 shows a frequency characteristic of an unnecessary wave suppressing means used in the receiving circuit of the first embodiment.
Figure 10:
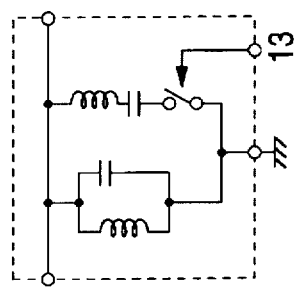
FIG. 10 is a circuit diagram showing an unnecessary wave suppressing means used in the receiving circuit of FIG. 1.

The unnecessary wave suppressing means 12 switches, in accordance with a switching signal that is supplied from the switching signal input terminal 13, between a wide band state (indicated by a solid line in FIG. 2) including both of the $f_1$ and $f_2$ frequency bands as pass bands and a state (indicated by a broken line in FIG. 2) in which the amount of signal passage is suppressed in a band in the vicinity of $f_1$ or $f_2$ by inserting a notch. As shown in FIG. 10, this may be done by combining a wide band filter and a notch filter and turning on/off the notch function in accordance with the switching signal.

A signal that has passed through the unnecessary wave suppressing means 12 is amplified by the amplifier 14 and input to the mixer 15. The mixer 15 converts the reception signal into an intermediate frequency signal by using an output signal (local signal) of the local oscillation means 17. The resulting intermediate frequency signal is output from the output terminal 16 and demodulated by the demodulating section of the receiver.

The receiving circuit of this embodiment can suppress the sensitivity at frequencies other than a receiving frequency (i.e., spurious sensitivity) to a low level, because in receiving a signal in one of the two frequency bands, unnecessary waves are suppressed by the unnecessary wave suppressing means 12.

Where part of a signal which is output from the unnecessary wave suppressing means 12 and which is in one of the two frequency bands will be substantially removed in the subsequent signal processing, it is not necessary to remove that part of the signal by the unnecessary wave suppressing means 12. For example, the unnecessary wave suppressing means 12 may be so constructed that the wide pass band is maintained in receiving a signal in the $f_2$ frequency band, and that signals in all the frequency ranges other than the $f_1$ frequency band are suppressed only in receiving a signal in the $f_1$ frequency band.

As described above, the receiving circuit of the first embodiment can receive signals in a plurality of frequency bands by a single receiving system without deteriorating the spurious sensitivity characteristic.

Embodiment 2

A receiving circuit according to a second embodiment is configured in the same manner as in the first embodiment (see FIG. 1) except that the unnecessary wave suppressing means 12 switches the pass frequency band width in accordance with a switching signal.

Figure 3:
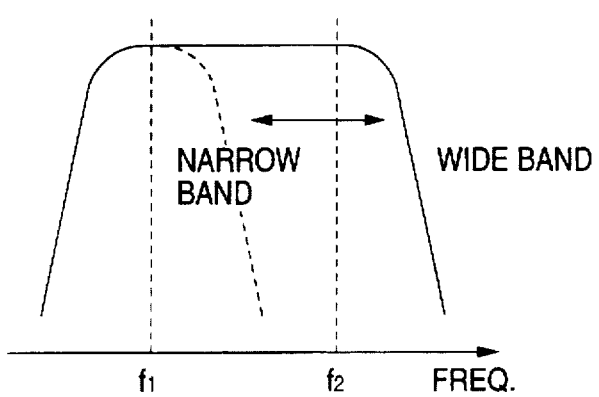
FIG. 3 shows a frequency characteristic of an unnecessary wave suppressing means used in a receiving circuit of a second embodiment of the invention.

As shown in FIG. 3, in receiving a signal in a $f_1$ frequency band, the unnecessary wave suppressing means 12 switches the pass band in accordance with the switching signal from a wide band to a narrow band which allows signal passage only in the $f_1$ frequency band, thereby suppressing signals in all the frequency ranges other than the $f_1$ frequency band.

The method of switching the pass band from a wide band to a narrow band in accordance with a receiving frequency band is superior to the method of limiting the pass band by inserting a notch (first embodiment) in the following points. In the latter method, where there are a plurality of unnecessary frequency bands in which signals should be suppressed, a notch needs to be inserted for each of those frequency bands. Accordingly, the circuit configuration becomes more complex. Further, there is a possibility that the sensitivity in the pass frequency band is lowered being influenced by insertion of notches. In contrast, in the case of switching the pass band width, there are no such influences relating to the number of unnecessary frequency bands in which signals should be suppressed.

Therefore, the receiving circuit of the second embodiment can prevent a deterioration of the sensitivity with respect to a signal in a pass frequency band, as well as prevent a deterioration of the spurious sensitivity characteristic.

Embodiment 3

A receiving circuit according to a third embodiment is configured in the same manner as in the first embodiment (see FIG. 1) except that the unnecessary wave suppressing means 12 has a plurality of pass bands corresponding to respective frequency bands used and switches between those pass bands in accordance with a switching signal.

Figure 4:
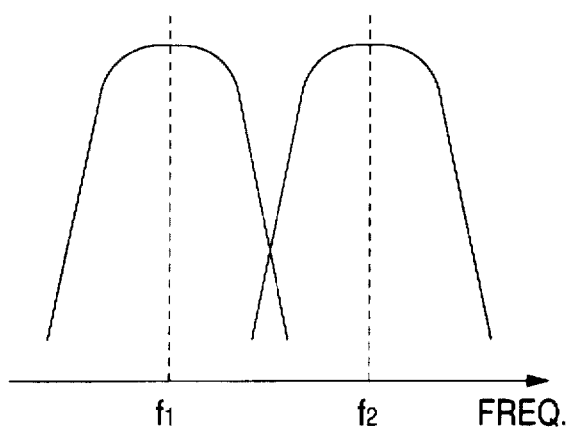
FIG. 4 shows a frequency characteristic of an unnecessary wave suppressing means used in a receiving circuit of a third embodiment of the invention.

As shown in FIG. 4, the unnecessary wave suppressing means 12 has two pass bands: a $f_1$ frequency band and a $f_2$ frequency band. When it is necessary to pass signals in both of the $f_1$ and $f_2$ frequency bands, the unnecessary wave suppressing means 12 uses both bands as pass bands. In receiving a signal in one of the $f_1$ and $f_2$ frequency bands, the unnecessary wave suppressing means 12 selects only the frequency band of the receiving signal as a pass band in accordance with the switching signal.

In this receiving circuit, in receiving a signal in the $f_1$ frequency band, signals in all the frequency ranges other than the $f_1$ frequency band are suppressed. In receiving a signal in the $f_2$ frequency band, signals in all the frequency ranges other than the $f_2$ frequency band are suppressed. Therefore, in receiving a signal in either frequency band, this receiving circuit can prevent a deterioration of the sensitivity with respect to a signal in a pass frequency band, as well as prevent a deterioration of the spurious sensitivity characteristic.

Embodiment 4

A receiving circuit according to a fourth embodiment is configured in the same manner as in the first embodiment (see FIG. 1) except that the unnecessary wave suppressing means 12 changes the pass frequency band continuously.

Figure 5:
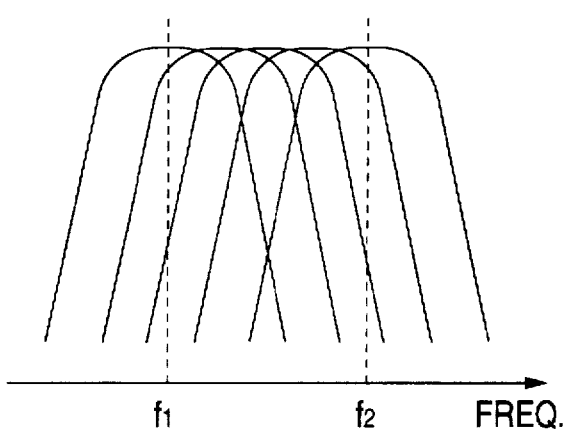
FIG. 5 shows a frequency characteristic of an unnecessary wave suppressing means used in a receiving circuit of a fourth embodiment of the invention.
Figure 6:
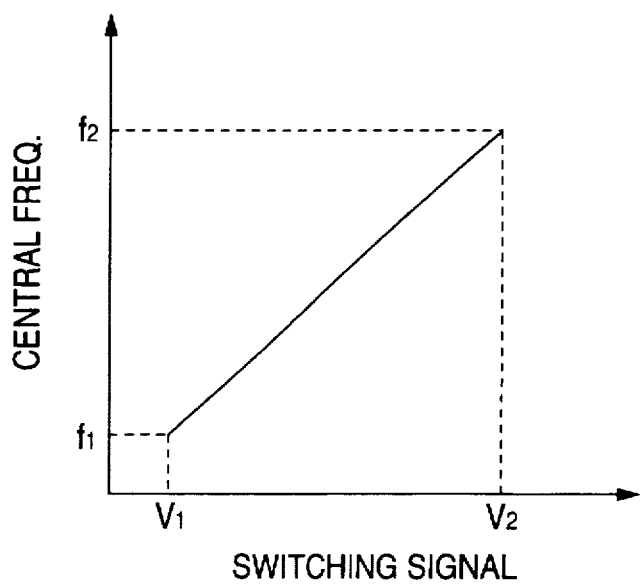
FIG. 6 shows how the unnecessary wave suppressing means changes the central frequency of a pass band in the receiving circuit of the fourth embodiment.

As shown in FIG. 6, the unnecessary wave suppressing means 12 is constituted of a narrow-band tuning filter in which the central frequency of a pass frequency band is changed continuously as a switching signal changes continuously. FIG. 5 shows how the pass frequency band is changed as the switching signal changes.

In this receiving circuit, the pass band is limited such that the switching signal is produced so as to allow passage of a signal of a known receiving frequency and the narrow-band tuning filter changes the central frequency of its pass band accordingly.

Capable of correctly following the frequency band of a receiving signal however it changes, the receiving circuit of the fourth embodiment can realize superior receiving characteristics.

Embodiment 5

Figure 7:
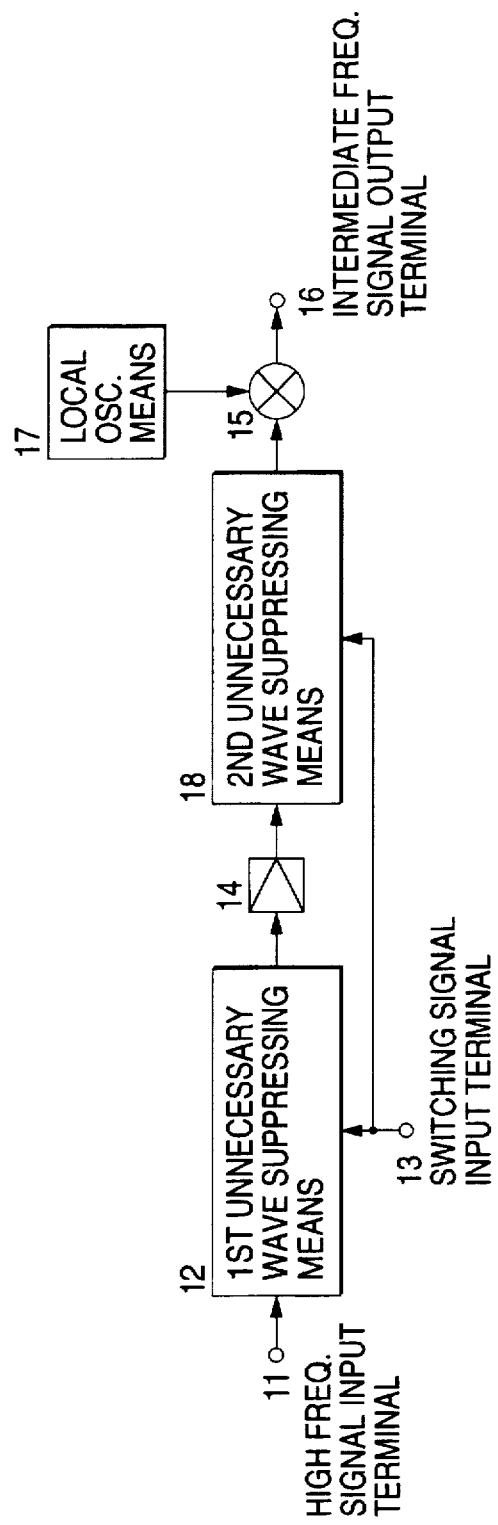
FIG. 7 is a block diagram showing the configuration of a receiving circuit according to a fifth embodiment of the invention.

As shown in FIG. 7, a receiving circuit according to a fifth embodiment has a first unnecessary wave suppressing means 12 for suppressing unnecessary waves included in a high frequency signal that is input from the input terminal 11, and a second unnecessary wave suppressing means 18 disposed between the amplifier 14 and the mixer 15 for suppressing unnecessary waves in a similar manner. The remaining part of the circuit configuration is the same as that of the first embodiment. The first and second unnecessary wave suppressing means 12 and 18 may employ any of the configurations in the first to fourth embodiments.

A reception signal coming from the high frequency signal input terminal 11 is subjected to unnecessary wave suppression by the first unnecessary wave suppressing means 12, amplified by the amplifier 14, subjected to further unnecessary wave suppression by the second unnecessary wave suppressing means 18, and input to the mixer 15. The mixer 15 converts the reception signal into an intermediate frequency signal by using an output signal (local signal) of the local oscillation means 17, and supplies the resulting intermediate frequency signal to the output terminal 16.

By virtue of the existence of the second unnecessary wave suppressing means 18, this receiving circuit secures a larger amount of attenuation with respect to unnecessary waves. Further, since the load on the first unnecessary wave suppressing means 12 is lowered, the size of the first unnecessary wave suppressing means 12 can be reduced as much. Alternatively, the second unnecessary wave suppressing means 18 may be a simple wide band filter with which pass band switching in accordance with a signal from the switching signal input terminal 13 is not performed. As a result, the entire receiver can be miniaturized while superior receiving characteristics are secured.

Embodiment 6

As shown in FIG. 8, a receiving circuit according to a sixth embodiment has a first receiving circuit 19 and a second receiving circuit 20, thus serving as a diversity receiving circuit. Each of the receiving circuits 19 and 20 is configured in the same manner as the receiving circuit of the fifth embodiment.

An output of one of the two receiving circuit systems (receiving circuit 19 or 20) in better receiving conditions is select by a demodulating section 28. With this configuration, superior receiving characteristics can be attained even under an unfavorable condition such as fading.

Embodiment 7

Figure 9:
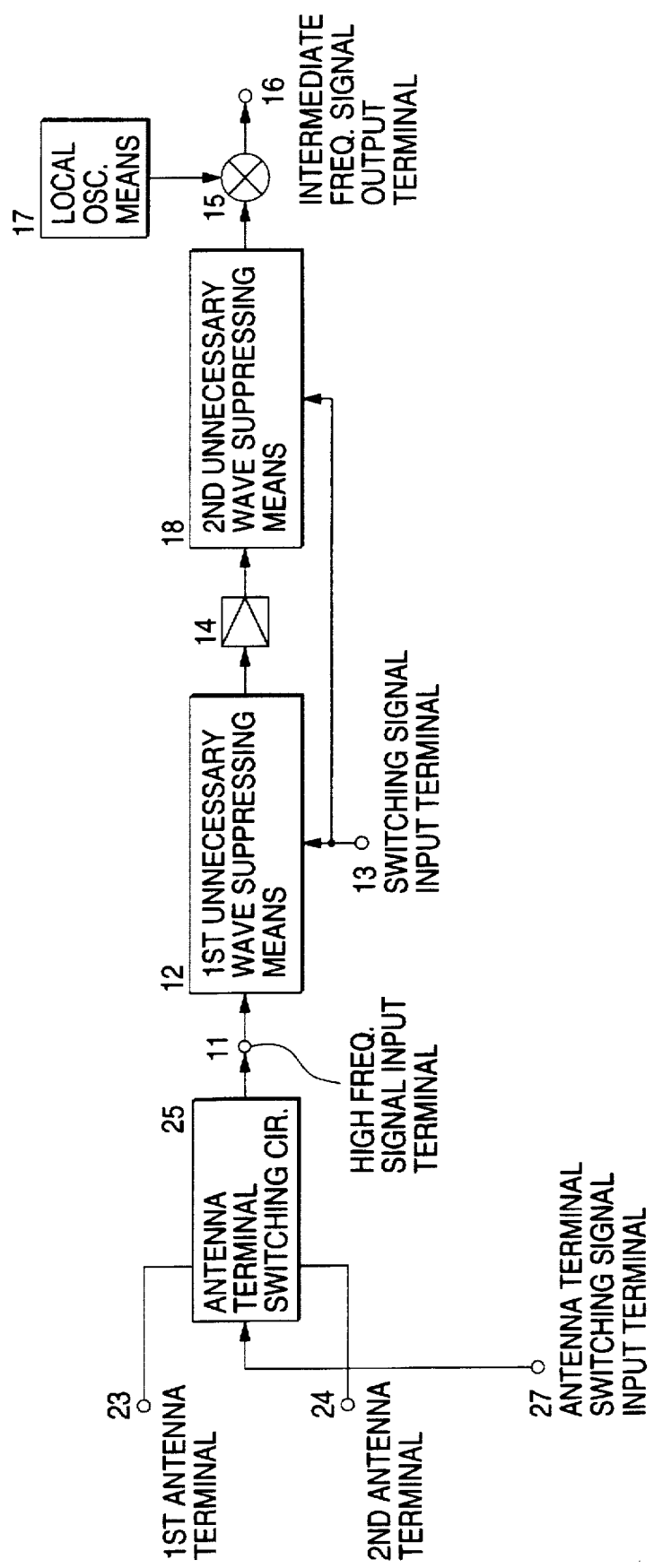
FIG. 9 is a block diagram showing the configuration of a receiving circuit according to a seventh embodiment of the invention.

As shown in FIG. 9, a receiving circuit according to a seventh embodiment has an antenna terminal switching circuit 25 upstream of the high frequency signal input terminal 11, thus serving as a diversity receiving circuit. The antenna terminal switching circuit 25 switches between a first antenna terminal 23 and a second antenna terminal 24 in accordance with a switching signal that is supplied from an antenna terminal switching signal input terminal 27. The remaining part of the circuit configuration is the same as that of the fifth embodiment.

In this receiving circuit, receiving signals being input to the first and second antenna terminals 23 and 24 are compared with each other. A switching signal for selecting an antenna terminal that is receiving a signal of a higher level, for instance, is supplied to the antenna terminal switching signal input terminal 27. In accordance with the switching signal, the antenna terminal switching circuit 25 selects a signal that is input from the first antenna terminal 23 or the second antenna terminal 24 and supplies it to the high frequency signal input terminal 11.

In this receiving circuit, by selecting a signal received by an antenna under better receiving conditions among signals received by a plurality of antennas, superior receiving characteristics can be attained even under an unfavorable condition such as fading. Further, constituted as a single receiving circuit system, this receiving circuit can be implemented to be small in size.

As is apparent from the above embodiments, the receiving circuit of the invention is provided with the unnecessary wave suppressing means which changes the pass frequency band. As a result, the invention allows, even with a configuration that is reduced in size, signal reception in a plurality of bands with superior receiving characteristics.

What is claimed is:

1. A receiving circuit for a portable telephone set which circuit converts a high frequency signal that is received by an antenna into an intermediate frequency signal, comprising:

means for receiving a switching signal;

means for suppressing an unnecessary wave included in the high frequency signal, said suppressing means being operable to chance a pass frequency band in accordance with the switching signal such that a portion of the received signal is passed and the remainder of the received signal is suppressed;

means for converting the portion of the received signal into an intermediate frequency.

2. The receiving circuit according to claim 1, wherein the unnecessary wave suppressing means suppresses the unnecessary wave by inserting at least one notch into a pass frequency band.

3. The receiving circuit according to claim 1, wherein the unnecessary wave suppressing means switches between at least two pass frequency band widths.

4. The receiving circuit according to claim 1, wherein the unnecessary wave suppressing means has at least two pass frequency bands, and switches between the two pass frequency bands.

5. The receiving circuit according to claim 1, wherein the unnecessary wave suppressing means changes a pass frequency band continuously in accordance with the switching signal.

6. The receiving circuit according to any one of claims 1 to 5, further comprising second unnecessary wave suppressing means for suppressing an unnecessary wave included in the portion of the received signal that is output from the unnecessary wave suppressing means.

7. The receiving circuit according to any one of claims 1 to 5, wherein the receiving circuit is provided in two systems, the receiving circuit further comprising means for selecting, between output intermediate frequency signals of the two system can output signal of a system in a better receiving condition.

8. The receiving circuit according to claim 6, wherein the receiving circuit is provided in two systems, the receiving circuit further comprising means for selecting, between output intermediate frequency signals of the two systems, an output signal of a system in a better receiving condition.

9. The receiving circuit according to any one of claims 1 to 5, further comprising:

a plurality of antennas; and means for selecting, among high frequency signals received by the plurality of antennas, a high frequency signal received by an antenna in a better receiving condition as the high frequency signal to be supplied to the unnecessary wave suppressing means.

10. The receiving circuit according to claim 6, further comprising:

a plurality of antennas; and means for selecting, among high frequency signals received by the plurality of antennas, a high frequency signal received by an antenna in a better receiving condition as the high frequency signal to be supplied to the unnecessary wave suppressing means.

* * * * *

UNITED STATES PATENT AND TRADEMARK OFFICE
CERTIFICATE OF CORRECTION

PATENT NO. : 5,794,134
DATED : August 11, 1998
INVENTOR(S) : Enoki et al.

It is certified that error appears in the above-identified patent and that said Letters Patent is hereby corrected as shown below:

Column 2, Line 10, delete "bands" and insert --bands,--.

Column 6, Line 51, Claim 1, delete "chance" and insert --change--.

Column 7, Line 14, Claim 7, delete "system can" and insert --systems, an--.

Signed and Sealed this

Twenty-ninth Day of December, 1998

*Attest:*

*Attesting Officer*

BRUCE LEHMAN
*Commissioner of Patents and Trademarks*